Figure 1:
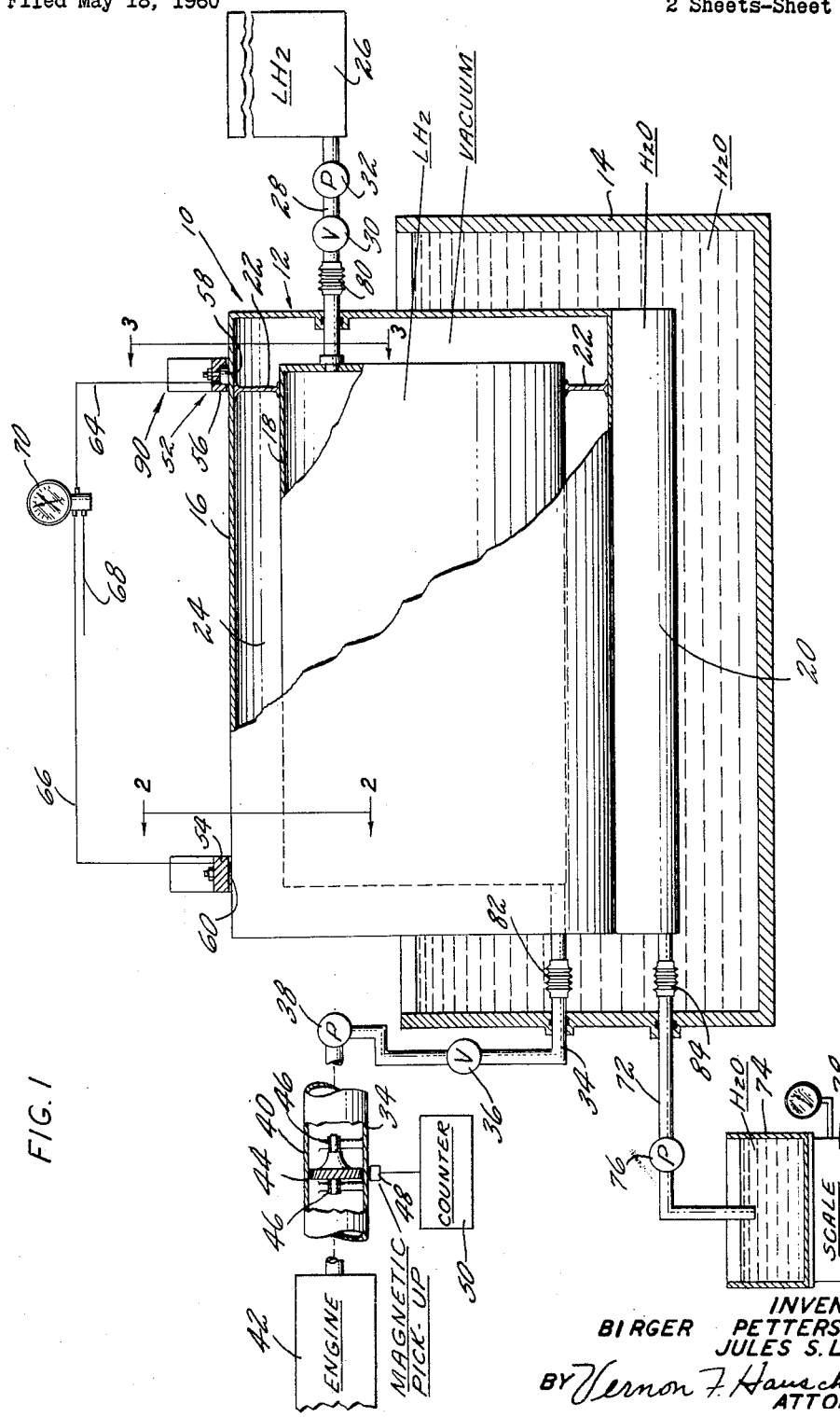

Dec. 18, 1962   B. PETTERSON, JR., ET AL   3,068,683
WEIGHT SYSTEM USING FLOATATION TO ELIMINATE TARE
Filed May 18, 1960   2 Sheets-Sheet 2

INVENTORS
BIRGER PETTERSON JR.
JULES S. LOMAX
BY Vernon F. Hauschild
ATTORNEY

United States Patent Office 3,068,683
Patented Dec. 18, 1962

3,068,683
WEIGHT SYSTEM USING FLOTATION TO ELIMINATE TARE
Birger Petterson, Jr., North Palm Beach, and Jules S. Lomax, Riviera Beach, Fla., assignors to United Aircraft Corporation, East Hartford, Conn., a corporation of Delaware
Filed May 18, 1960, Ser. No. 29,905
8 Claims. (Cl. 73—3)

This invention relates to the measurement by weight of a volatile fluid such as liquid hydrogen ($LH_2$) and more particularly to apparatus and method for obtaining a mass flow reading of liquid hydrogen being pumped through a properly calibrated volumetric flow meter.

In rocket or missile type vehicles which will travel at high speed and probably into space, it is important that we note the mass fuel consumption of the vehicle since this will permit us to determine the actual specific impulse thereof. This is important since actual specific impulse is approximately equal to power generated/weight fuel/time.

It is an object of this invention to teach apparatus and method whereby the mass flow of fuel may be measured when the engine is operating on the test stand in terms of the reading of a properly calibrated volumetric flow meter, which flow meter, or its equivalent, will be available to accomplish the fuel mass flow consumption reading during vehicle flight.

The problem of measuring the mass flow of the fuel is particularly acute in vehicles where liquid hydrogen ($LH_2$) is used as a propellant due to the large quantities of liquid hydrogen used and, further, due to its high volatility. In this, to maintain hydrogen in the liquid state, the temperature thereof must be kept below minus 422° F. and, further, liquid hydrogen is extremely light in weight, for example, .58 lb. per gallon at boiling point, one atmosphere.

It is an object of this invention to teach apparatus and method for ascertaining the mass flow of liquid hydrogen being pumped to an engine utilizing a plural cavity, insulated tank floating in a liquid such as water, then adding a weight to the tank interior such as adding water thereinto to cause the floatable tank to assume a depressed position in the water, and then restraining the floatable tank so positioned by means of apparatus which measures the force required to so restrain the tank as the weight, such as water, is pumped therefrom into a vessel wherein the weight of water pumped from the tank may be accurately ascertained to accurately calibrate the tank restraining force variation with changes in the weight of the water pumped from and remaining in the tank. When a volatile fuel such as liquid hydrogen is then introduced into and pumped from said tank unit through a volumetric flow meter, the flow meter may be calibrated by the restraining force measuring means so as to read in mass flow. The volumetric flow meter is now calibrated to read fuel mass flow and hence, when used in the vehicle in flight may be used to perform this function.

Other objects and advantages will be apparent from the specification and claims, and from the accompanying drawings which illustrate an embodiment of the invention.

FIG. 1 is a schematic showing, partially in section, of the apparatus illustrating our invention.

Figure 2:
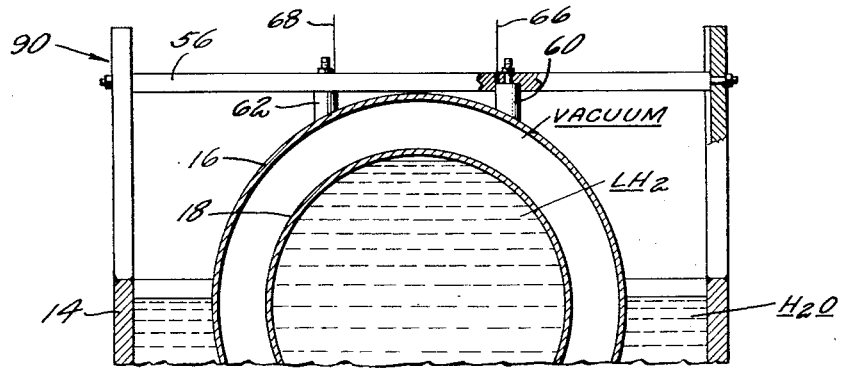
Figure 3:
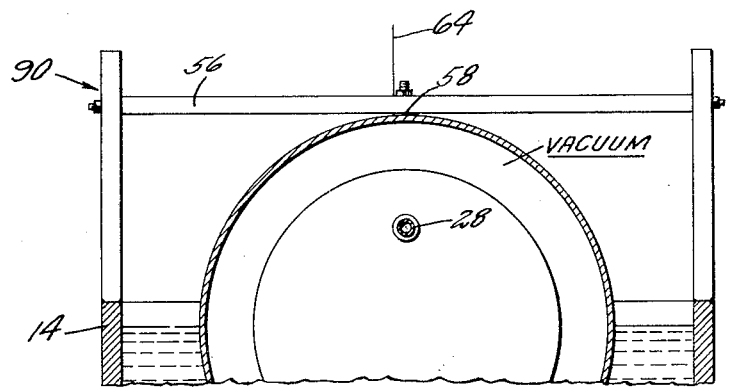

FIGS. 2 and 3 are views taken along lines 2—2 and 3—3, respectively, of FIG. 1.

Referring to FIG. 1 we see our mass flow measuring apparatus 10 which consists of floatable tank unit 12 floating in water basin 14. Floatable tank unit consists of outer tank 16, inner tank 18 and bottom tank 20. Inner tank 18 is preferably positioned concentrically within outer tank 16, possibly by means of a plurality of support webs 22 extending radially therebetween. Bottom tank 20 is separate from but attached to the outer periphery of outer tank 16. Due to the volatility and the low temperature requirement of the liquid hydrogen which will eventually enter inner tank 18, tank 18 is insulated by the evacuation to a vacuum of the annular cavity 24 defined between outer tank 16 and inner tank 18.

Reservoir 26, which may be at least as large as inner tank 18, is connected through line 28 to the interior of inner tank 18 so that, with valve 30 open, liquid hydrogen may be pumped from reservoir 26 through line 28 into the interior of inner tank 18 by pump 32. Liquid hydrogen may be pumped from inner tank 18 through line 34 with valve 36 open, due to the pumping action of pump 38. The liquid hydrogen so scavenged from tank 18 is passed through volumetric flow meter and then eventually to rocket engine or missile 42 which may be of the type shown generally in U.S. Patent No. 2,395,133 or 2,935,843 and 2,935, 844.

Volumetric fuel meter 40 may be of any of many commercially available types, for example the Potter Turbine Type Fuel Meter sold commercially by Potter Aeronautical Corporation, Route 22, Union, New Jersey and consists of a bladed turbine 44 which is supported for rotation in duct 34 by any convenient means such as bearings 46 so that the liquid hydrogen passing through conduit 34 must pass through the peripheral blades of turbine 44, thereby causing turbine 44 to rotate. A magnetic pickup 48 is positioned immediately outboard of turbine 44 so that the passage of each turbine blade thereby intercepts a magnetic flux to send a signal to counter 50. By appropriate and well-known calibration, volumetric flow meter 40 and counter 50 may be calibrated, in a fashion to be described hereinafter to read in mass flow of liquid hydrogen therethrough. Any fluid, such as water or any weights may be added into bottom tank 20 to cause tank unit 12, which if floating in water basin 14, to assume a depressed position due to the weight of water in tank 20. Preferably, a selected weight of water, equal to the weight of liquid hydrogen needed for an engine run, is admitted to tank 20. With tank unit 12 in this depressed position due to the weight of water in bottom tank 20, a restraining bridge circuit 52 may be used to restrain the floating tank unit 12 in this depressed position. Bridge circuit 52 may comprise two H-shaped frames or bridges positioned at opposite ends of tank unit 12 and include horizontal support members or I beams 54 and 56 respectively. Load cells of conventional design such as 58, 60 and 62 are supported in jack fashion from horizontal members 54 and 56 as best shown in FIGS. 2 and 3 and are of commercially available design such as the compression type of Cox-Stevens Load Cell sold by Revere Corporation of America or the type of load cells illustrated on pages 203–205 of a publication entitled "The Strain Gauge Primer" by Perry and Lissner published by McGraw-Hill in 1955. Load cells are generally of the transducer types and serve to the general function, in strain gauge fashion, of generating an electric signal in proportion to the load, whether tension or compression, imparted thereto. In this instance the fuel cells 58, 60 and 62 impart additive electric signals through lines 64, 66 and 68, respectively, to read out or meter 70. We choose to use three triangularly positioned load cells solely to provide optimum, three position support to tank unit 12. It will be obvious to those skilled in the art that any number of load cells could as well have been used. Further the bridge circuits for tank unit 12 are preferably designed to permit the .003" load cell travel.

With our selected quantity of water in bottom tank 20, the load cells will be brought into the position wherein they are supported by their respective support members 54 and 56 and bear against the outer surface of outer tank 16 and properly preloaded. As the water is pumped from bottom tank 20 through line 72 and into reservoir 74 by pump 76, the weight of water so pumped will be accurately recorded at all times by scale 78, upon which reservoir 74 rests. It will be obvious to those skilled in the art that the water pumped into tank 20 may come from tank 74 and that one or more load cells may be used in place of scale 78. In similar fashion, a weight seal could replace load cell system 90.

It will be noted that lines 28, 34 and 72 include flexible members such as bellows 80, 82 and 84, respectively, to permit the free motion of tank unit 12 within basin 14.

As water is pumped from bottom tank 20 into reservoir 74 the plurality of load cells will be actuated by the compressive load thereagainst to impart additive electric signals to read out or meter 70, thereby recording the force necessary to restrain tank unit 12 in its depressed position. It will be obvious that by the use of the water pumped weight figure given by the water measuring scale 78, meter 70 of load cell system 90 may be calibrated to read in the weight of fluid pumped from tank unit 12.

When either all of the water or a substantial part thereof is pumped from tank 20 into reservoir 74, so that the meter 70 is fully calibrated, we may then introduce the selected amount of liquid hydrogen for engine run from reservoir 26 into middle tank 18 and measure the weight of hydrogen so introduced by the reading of the calibrated load cell system meter 70. Engine 42 may then be started and by the action of pump 38, the prescribed amount of liquid hydrogen that had been pumped into tank 18 may now be pumped therefrom and passed through volumetric fuel meter 40 into engine 42 thereby permitting, by the use of the calibrated load cell system meter 70, to impart a mass flow of liquid hydrogen reading to counter 50 for calibration to mass flow reading of the volumetric fuel meter 40.

With flow meter 40 and counter 50 so calibrated, it will be evident that the mass flow of liquid hydrogen being pumped to engine 42 in flight may be ascertained by reading counter 50 so calibrated. Simultaneously, we read the weight of liquid hydrogen being pumped to the engine by reading meter or read-out 70.

It will be obvious to those skilled in the art that with our apparatus, so calibrated, if a greater amount of fuel than is containable in inner tank 18 need be used for the operation of engine 42, then pumping may occur simultaneously from both tanks 18 and 26, with tank 18 first used as part of the flow line for the fluid from tank 26.

As an alternative method, both tanks 18 and 26 may be filled with liquid hydrogen and then tank 26 may be pressurized to commence the flowing of liquid oxygen from both tanks simultaneously, with the floating tank 18 first serving as an additional pipeline until stationary tank 26 empties. The flow of gas into the tank system for pressurization can be measured by a recording orifice meter and this weight factor computed from gas flow and temperature. With this system, the need for pumping is eliminated.

It is to be understood that the invention is not limited to the specific embodiment herein illustrated and described but may be used in other ways without departure from its spirit as defined by the following claims.

We claim:

1. The method of determining the weight of a volatile fluid comprising a nonvolatile fluid in a floating tank unit, restraining the tank in position in this condition by strain measuring means removing the nonvolatile fluid from the tank while calibrating the weight of nonvolatile fluid removed from the tank against the strain measuring means reading, then placing the volatile fluid in said tank unit and reading the weight of the volatile fluid on the calibrated strain measuring means.

2. The method of determining mass flow of a volatile fluid by determining the volume flow thereof comprising calibrating a floating tank to determine the force required to restrain it in position as a nonvolatile fluid is removed therefrom, then utilizing the restraining force calibration to calibrate volumetric flow measuring apparatus as volatile fluid is pumped from the floating tank so restrained and thru the volumetric flow measuring apparatus.

3. Apparatus to measure the weight of a volatile fluid comprising a float basin containing fluid, a floatable insulated plural cavity tank unit positioned to float in said float basin, means to introduce a fluid into a first of said cavities to depress said floatable tank unit in the fluid of said float basin, means to restrain said floatable tank unit in said depressed position, means to determine the force necessary to restrain said tank unit in said depressed position, means to remove said fluid from said first cavity and calibrate the weight of said fluid removed from said cavity against the tank unit restraining force so measured, and means to introduce a volatile fluid into the second of said cavities so that said calibrated restraining force measuring means may be used to indicate volatile fluid weight.

4. Apparatus to measure weight of a volatile fluid comprising a float basin containing fluid, a floatable tank unit positioned to float in said float basin, means to add weight thereto to depress said floatable tank unit in the fluid of said float basin, means to restrain said floatable tank unit in said depressed position, means to determine the force necessary to restrain said tank unit in said depressed position as said weight is gradually removed to effect a calibration of restraining force against weight removed, and means to introduce a volatile fluid into the said tank unit so that said calibrated restraining force measuring means may be used to indicate volatile fluid weight.

5. Apparatus to measure mass flow of a volatile fluid comprising a float basin containing fluid, a floatable tank unit positioned to float in said float basin, means to add weight thereto to depress said floatable tank unit in the fluid of said float basin, means to restrain said floatable tank unit in said depressed position, means to determine the force necessary to restrain said tank unit in said depressed position as said weight is gradually removed to effect a calibration of restraining force against weight removed, and means to introduce a volatile fluid into the said tank unit and then gradually remove it therefrom thru a volumetric flow meter so that calibrated restraining force measuring means and said flow meter may be used to indicate the mass flow of the volatile fluid.

6. Apparatus to measure mass flow of a volatile fluid comprising a fluid basin, a tank unit floating in said basin, means to add weight thereto to depress said floatable tank unit in said fluid basin, means to restrain said floatable tank unit in said depressed position, means to determine the force necessary to restrain said tank unit in said depressed position as said weight is gradually removed to effect a calibration of restraining force against weight removed, and means to introduce a volatile fluid into the said tank unit and then gradually remove it therefrom thru a volumetric flow meter so that said calibrated restraining force measuring means and said flow meter may be used to indicate the mass flow of the volatile fluid.

7. Apparatus to measure mass flow of liquid hydrogen comprising a water basin, a tank unit floating in said basin, means to add water therein to depress said floatable tank unit in said basin, a bridge structure to restrain said floatable tank unit in said depressed position, at least one load cell positioned between said tank unit and said bridge structure to determine the force necessary to restrain said tank unit in said depressed position as said water is gradually removed and onto an accurate weight scale to effect a calibration of restraining force against the weight of water removed, and means to introduce liquid hydrogen into the said tank unit and then gradually remove it therefrom thru a turbine type volumetric flow meter so that said calibrated restraining force measuring load cell and said flow meter may be used to indicate the mass flow of the liquid hydrogen.

8. Apparatus to measure mass flow of a volatile fluid comprising a float basin containing liquid, a floatable tank unit floating in said float basin, means to add weight thereto to depress said floatable tank unit in the liquid of said float basin, means to restrain said floatable tank unit in said depressed position, means to determine the force necessary to restrain said tank unit in said depressed position as said weight is gradually removed to effect a calibration of restraining force against weight removed, and means to introduce a volatile fluid into the said tank unit and then gradually remove it therefrom thru a volumetric flow meter so that said calibrated restraining force measuring means may be used to measure the mass flow of the volatile fluid and to calibrate said flow meter to indicate the mass flow of the volatile fluid.

References Cited in the file of this patent

UNITED STATES PATENTS

| | | |
|---|---|---|
| 2,844,350 | Higham et al. | July 22, 1958 |
| 2,938,701 | Thorsson et al. | May 31, 1960 |

UNITED STATES PATENT OFFICE
CERTIFICATE OF CORRECTION

Patent No. 3,068,683            December 18, 1962

Birger Petterson, Jr., et al.

It is hereby certified that error appears in the above numbered patent requiring correction and that the said Letters Patent should read as corrected below.

Column 3, line 65, after "comprising" insert -- placing --.

Signed and sealed this 28th day of May 1963.

(SEAL)
Attest:

ERNEST W. SWIDER
Attesting Officer

DAVID L. LADD
Commissioner of Patents